US008246862B2

(12) United States Patent
Molaire

(10) Patent No.: US 8,246,862 B2
(45) Date of Patent: Aug. 21, 2012

(54) STATIC DISSIPATIVE POLYMERIC COMPOSITION HAVING CONTROLLED CONDUCTIVITY

(75) Inventor: Michel F. Molaire, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 397 days.

(21) Appl. No.: 12/512,278

(22) Filed: Jul. 30, 2009

(65) Prior Publication Data

US 2011/0024696 A1 Feb. 3, 2011

(51) Int. Cl.
*H01B 1/06* (2006.01)
*B60C 1/00* (2006.01)

(52) U.S. Cl. ........................................ 252/511; 524/495

(58) Field of Classification Search ....... 252/500–521.6, 252/511; 524/495
See application file for complete search history.

(56) References Cited

U.S. PATENT DOCUMENTS 3,563,916 A 2/1971 Takashina et al.
3,576,378 A 4/1971 Hilmanowski
3,836,482 A 9/1974 Ling et al.
4,288,352 A 9/1981 Weiss et al.
4,634,865 A 1/1987 Conway
4,729,925 A 3/1988 Chen et al.
4,762,941 A 8/1988 Chen et al.
4,765,930 A * 8/1988 Mashimo et al. ............. 252/511
4,910,389 A * 3/1990 Sherman et al. .............. 219/548
4,976,890 A * 12/1990 Felter et al. .................. 252/511
5,409,968 A 4/1995 Clatanoff et al.
5,487,707 A 1/1996 Sharf et al.
5,514,436 A 5/1996 Schlueter, Jr. et al.
5,547,609 A * 8/1996 Fujii et al. ...................... 252/511
5,705,555 A * 1/1998 Guilfoy et al. ................ 524/495
5,721,032 A 2/1998 Parker et al.
5,798,060 A * 8/1998 Brevett ...................... 252/520.1
5,828,931 A 10/1998 May et al.
5,908,585 A * 6/1999 Shibuta ......................... 252/506
5,968,656 A 10/1999 Ezenyilimba et al.
6,327,454 B1 12/2001 Yuan et al.
7,214,757 B2 5/2007 Gloyer et al.
2010/0173108 A1* 7/2010 Nagao et al. ................. 428/36.9

OTHER PUBLICATIONS

Park, E.S., "Resistivity and Thermal Reproducibility of the Carbon Black and SnO2/Sb Coated Titanium Dioxide Filler Silicone Rubber Heaters," Macromol. Mater. Eng., 290, pp. 1213-1219 (2005).*

* cited by examiner

*Primary Examiner* — Mark Kopec
*Assistant Examiner* — Jaison Thomas
(74) *Attorney, Agent, or Firm* — Andrew J. Anderson

(57) ABSTRACT

The invention provides semi-conductive, static dissipative polymeric compositions comprising: an insulating polymeric resin; a first antistatic particulate material having a relatively low threshold percolation wt % concentration, wherein the first antistatic particulate material is present in the composition at from 50-150% of its threshold percolation wt % concentration; and a second antistatic particulate material having a relatively higher threshold percolation wt % concentration, wherein the second antistatic particulate material is present in the composition at from 1-110% of its threshold percolation wt % concentration. The invention enables forming semi-conductive, static dissipative polymeric compositions having volume resistivity easily controllable within the range of from about $10^4$ ohm-cm to about $10^{11}$ ohm-cm. The invention further provides castable semi-conductive, static dissipative polymeric compositions wherein the insulating polymeric resin is formed from castable compositions.

20 Claims, 6 Drawing Sheets

STATIC DISSIPATIVE POLYMERIC COMPOSITION HAVING CONTROLLED CONDUCTIVITY

FIELD OF THE INVENTION

The invention relates to electrostatic dissipative polymeric compositions having controlled conductivity. More specifically, the invention concerns static-dissipative polymeric compositions consisting of an insulating polymeric based resin and two distinct antistatic particulate materials having different threshold percolation concentrations.

DESCRIPTION OF THE RELATED ART

Traditional electrically active plastic composites use highly conductive particulate filler materials in an insulating polymeric base resin. Such particulate materials may have relatively low aspect ratios (e.g., in the form of powders where length, width and height of individual particles are roughly equal), or relatively high aspect ratios (e.g., in the form of fibers having length substantially greater than width and thickness, or flakes having length and width both substantially greater than thickness). Commonly employed electrically active particulate filler materials include carbon powder, carbon fiber, metal powders, fibers and flakes, and metalized particles, fibers and flakes. These are disclosed in multiple patents, e.g., U.S. Pat. Nos. 4,634,865 and 4,288,352, the disclosures of which are incorporated by reference herein.

The filler must be used in an adequate volume concentration or "loading" for the individual particles or fibers to effectively be in electrical contact in order for the resulting composite to be electrically conductive. The level of conductivity depends on the number of conductive paths created by the particles or fibers. Low levels of filler are ineffective, because there are few conductive paths formed. Therefore, to increase conductivity, the amount of filler must be increased. These techniques work well for composites in the conductive range (volume resistivity of $10^1$-$10^4$ ohm-cm) as this range falls in a region for highly conductive fillers where a small change in filler concentration has little effect on the conductivity of the composite because so many conductive paths exist.

However, using these highly conductive fillers to obtain composites with controlled conductivity in the semi-conducting range (volume resistivity of $10^4$-$10^{11}$ ohm-cm) causes problems. For fillers of high conductivity, this range typically falls into a region where a small change in filler loading causes a large change in the conductivity of the composite. This makes the conductivity very difficult to control in such range. This sensitive balance between the conductive filler and the insulating resin is further complicated by processing variations such as polymer/fiber orientation, density, shear rates and cooling rates.

Composites using highly conductive fillers also typically suffer from other detrimental characteristics:

In composites utilizing conductive fillers with a relatively high aspect ratio, i.e., fibers or flakes, the ratio of conductive filler to insulating polymer must be relatively low to control the number of connections. This results in greatly reducing the probability of providing a "ground" or an electrical path for a static charge to dissipate through.

In composites utilizing conductive powder fillers, e.g., carbon powder, as disclosed in U.S. Pat. Nos. 3,563,916 and 3,836,482, the composite exhibits "sloughing" where the powder filler rubs off, coming out of the polymeric matrix.

In composites utilizing metals as the conductive filler, i.e., metal powders, fibers and flakes, as disclosed in U.S. Pat. No. 3,576,378, the metal particles are very dense compared to the polymer matrix and thus tend to separate from the matrix during processing resulting in a non-homogenous composite.

In composites utilizing conventional metalized particles, i.e., microspheres, microbubbles, fibers and flakes, the material coating is typically limited to solution processing techniques or "plating" where the coatings are relatively thick and expensive. Solution processing techniques generally limit the materials to those with high conductivities thereby yielding composites conductive rather than semi-conductive. In addition, plating technology has metal adhesion problems where the metal plating nodules pull away and separate from the host particle.

U.S. Pat. No. 5,409,968 discloses that a high aspect ratio filler such as a fiber or a flake having thereon a thin layer of a high conductivity metal, having thereover a layer of an insulating oxide, can be used at lower loadings with an insulating resin to provide a semi-conductive composite. The invention of U.S. Pat. No. 5,409,968 provides semi-conductive, static dissipative polymeric composites comprising: a) an insulating polymeric resin, and b) from about 5 to about 35 volume percent of at least one high aspect ratio filler having thereon a thin-film inorganic layer of from about 10 .ANG. to about 1000 .ANG. of a highly conductive metal and an overlayer of an insulating metal oxide, said layer having an average coating thickness of from about 2 .ANG. to about 200 .ANG., the composites having volume resistivities of from about $10^4$ ohm-cm to about $10^{11}$ ohm-cm.

One drawback of the static dissipative materials of U.S. Pat. No. 5,409,968 is the need for the extra step of overcoating the conductive material. In many instances the cost of the material is substantially increased. Another drawback of this approach requires the use of high aspect ratio fillers. These high aspect ratio fillers not only control the conductivity of the compositions, but also influence its mechanical properties. For many applications the change in mechanical properties is unwanted.

There is a need to provide static dissipative polymeric compositions with controllable conductivities in the semi-conductive range that are relatively inexpensive and require no additional processing of the conductive materials.

There is a further need to provide static dissipative polymeric compositions with controllable conductivities in the semi-conductive range where the initial mechanical properties of the binder material are minimally affected.

After many experiments, this inventor has found that conventional materials such as carbon black, tin oxide, tin oxide coated titanium dioxides can be formulated to provide static dissipative polymeric compositions with controllable conductivities in the semi-conductive range that are relatively inexpensive, without any needs for special surface modifications.

This inventor has unexpectedly found that two conductive materials with different percolation concentration thresholds, can be combined, even at below their individual percolation concentration thresholds respectively, to impart conductivity to an insulating binder in very controllable fashion.

SUMMARY OF THE INVENTION

The invention provides semi-conductive, static dissipative polymeric compositions comprising:

a) an insulating polymeric resin, b) a first antistatic particulate material having a relatively low threshold percolation wt % concentration, wherein the first antistatic particulate material is present in the composition at from 50-150% of its threshold percolation wt % concentration; and c) a second antistatic particulate material having a relatively higher threshold percolation wt % concentration, wherein the second antistatic particulate material is present in the composition at from 1-110% of its threshold percolation wt % concentration.

The invention enables forming semi-conductive, static dissipative polymeric compositions having volume resistivity easily controllable within the range of from about $10^4$ ohm-cm to about $10^{11}$ ohm-cm. The invention further provides castable semi-conductive, static dissipative polymeric compositions wherein the insulating polymeric resin is formed from castable compositions. The invention further provides semi-conductive adhesive compositions capable of matching the conductivity of semi-conductive elements.

DETAILED DESCRIPTION OF THE INVENTION

Figure 1:
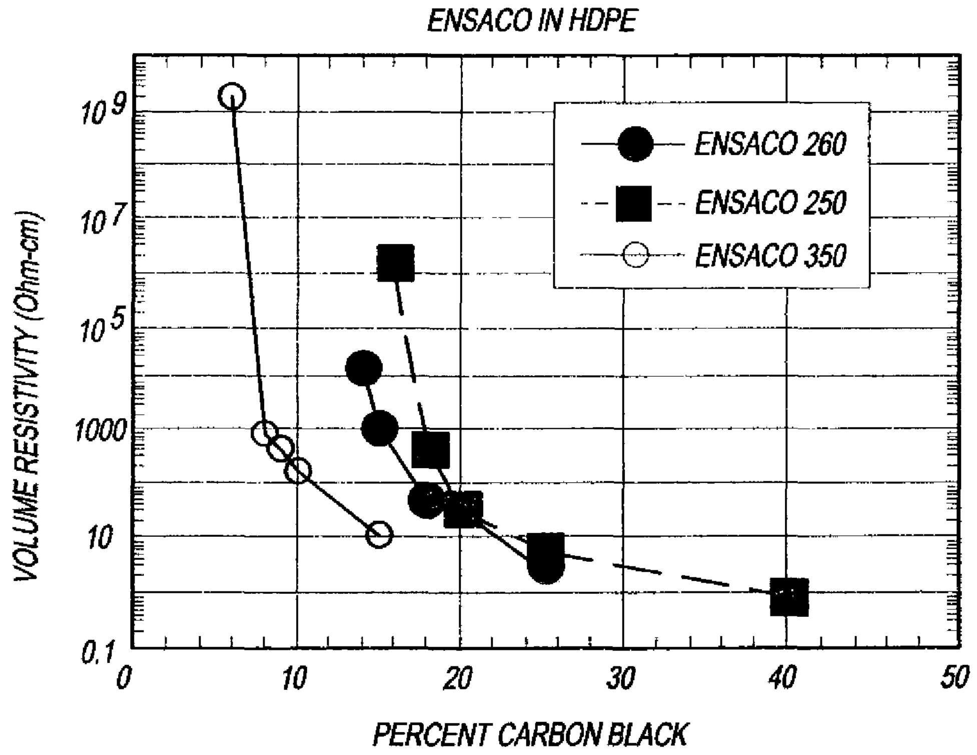
FIG. 1 is a graph showing percolation curves for ENSACO™ 250, ENSACO™ 260, and ENSACO™ 350 carbon black in HDPE polyethylene as provided by the manufacturer R.T. Venderbilt Company, Inc.

The invention is a semi-conducting plastic composite comprised of an antistatic particulate material having a relatively low threshold percolation wt % concentration, an antistatic particulate material having a relatively high threshold percolation wt % concentration, and an insulating base resin resulting in controllable electrical properties in the range of $10^4$-$10^{11}$ ohm-cm volume resistivity.

As used herein, the following terms have these meanings.

“Threshold percolation wt % concentration” is the concentration of a conductive particulate material in an insulating binder at which the conductive material starts to impart conductivity to the insulating binder/conductive material composition.

“High Threshold” conductive material refers to a conductive material requiring a relatively high wt % concentration before starting to impart conductivity to the insulating binder material.

“Low Threshold” conductive material refers to a conductive material requiring a relatively low wt % concentration before starting to impart conductivity to the insulating binder material.

In various embodiments, the composite materials of the invention can comprise solvent coatable, castable, or extrudable polymer compositions. There currently are a number of commercialized products, e.g., made from polymers such as polyurethanes and polyureas. Typically, these products are made from either thermoplastic polymers or thermoset polymers. Thermoplastic polymers generally have linear molecular structures and are able to flow freely at elevated temperatures. For this reason, thermoplastic polymers are preferred for products which are produced by injection molding or other extrusion techniques, or solvent coating, where flowability of the reactants are of paramount importance. Unfortunately, thermoplastic polymers typically exhibit poor performance characteristics with respect to abrasion, tensile strength, rebound, and compression set compared to thermoset polymers.

In contrast to current thermoplastic polymers, or polyurethanes, thermoset polymers, or polyurethanes have particularly good characteristics with respect to abrasion, tensile strength, rebound, and compression set. Thermoset polymers generally have a network structure that incorporates irreversible chemical cross-linking. The downside of thermoset polymers is that the irreversible chemical cross-linking reaction makes it unsuitable for use in injection molding and extrusion applications. Typically, composites comprising thermoset polymers are formed using a casting process. In a typical process for making a thermoset (i.e., castable) polyurethane (or polyurea) composition, a di-isocyanate component is first pre-polymerized with a polyol having either a polyester or polyether backbone. The remaining di-isocyanate of the prepolymer is reacted with a chain extender or a cross-linking agent or a blend of cross-linking agents. Catalysts are added to control the reaction rate. If the cross-linking agent has a dihydroxy functional component, a polyurethane will be formed. If the cross-linking agent has diamine functionality, a polyurea is formed.

Useful insulating polymeric resins in composites of the invention include, but are not limited to thermosets such as epoxies, urethanes, and thermoplastics such as polyesters, polycarbonates, polysulfones, polyimides, polyethers, such as polyether sulfone, and polyolefins such as light, medium and high density polyethylene, ethylene-propylene copolymer, either random or block configuration, polypropylene-maleic acid anhydride, polystyrene, styrene-acrylonitrile copolymer, acrylonitrile-butadiene-styrene, poly(methyl methacrylate), ethylene vinyl acetate, ethylene-acrylic acid copolymer, vinyl chloride-polypropylene copolymers, polyisobutylene, polybutadiene, and crosslinked polyethylene, whether chemically, thermally, UV or E-beam (EB) crosslinked, and polyphenylene sulfide, polyetheretherketone, polyetherimide, polyarylsulfone and polypropylene oxide modified polyether sulfones.

Useful insulating compositions in composites of the invention include radiation curable compositions. “Radiation curable” means compositions composed of various reactive components which cure by polymerization through free radical or ionic mechanisms with the use of radiation whether of the UV or EB type.

"Cationic UV curable polymers" are well known polymeric materials characterized by the presence of oxirane functionality, and which are curable through a cationic induced polymerization mechanism. Suitable diluents include cycloaliphatic epoxy monomers, or oligomers, and vinyl ether monomers. UV curable cationic photoinitiators that are suitable are the various sulfonium or iodonium initiators. A typical curable cationic epoxide coating is a mixture of 3,4-epoxy cyclohexylmethyl 3,4-epoxy cyclohexyl carboxylate, vinylcyclohexene monoxide, 3-ethyl-3-(hydroxymethyl) oxetane, and mixed triarylsulfonium hexafluorophosphate salts as the UV photoinitiator.

Also useful for the practice of this invention are moisture curable compositions. "Moisture curable" polymers refer to the well-known polymers capped with isocyanate groups which undergo curing in the presence of water.

Preferred semi-conductive, static-dissipative, polymeric compositions comprise castable, coatable, or extrudable polyurethane compositions. Such compositions are described in U.S. Pat. No. 4,729,925, U.S. Pat. No. 4,762,941, U.S. Pat. No. 5,968,656, U.S. Pat. No. 5,828,931, and U.S. Pat. No. 7,214,757, the disclosures of which are incorporated by reference herein.

Antistatic particulate materials useful as low threshold percolation concentration fillers in the present invention include the extra-conductive carbon black such as ENSACO™ 350 and the Super Conductive carbon black manufactured by Timcal Graphite & Carbon, KETJENBLACK EC-300J and EC600JD sold by AkzoNobel company. Other conductive carbons usable in the invention include acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes DENKA Acetylene Black manufactured by Denki Kagaku K.K., SHAWINIGAN Acetylene Black manufactured by Shawinigan Chemical Co., the conducting furnace black includes CONTINEX CF manufactured by Continental Carbon Co. and VULCAN C manufactured by Cabot Corp., the super conducting furnace black includes CONTINEX SCF manufactured by Continental Carbon Co. and VULCAN SC manufactured by Cabot Corp., the extra conducting furnace black includes ASAHI HS-500 manufactured by Asahi Carbon K.K. and VULCAN XC-72 manufactured by Cabot Corp., and the conducting channel black includes CORAX L manufactured by Degussa Co. Also useful are modified furnace blacks commercially available as KETJEN BLACK EC and KETJEN BLACK EC-600JD from Ketjen Black International. Preferred among others is acetylene black because it is more conductive due to a reduced impurity content and a well developed secondary structure. Also, KETJEN BLACK EC and KETJEN BLACK EC-600JD are useful because they have an extremely increased specific surface area so that sufficient conductivity is accomplished with a low loading.

Antistatic particulate materials useful as high threshold percolation concentration fillers in the present invention include the semi-conductive carbon ENSACO™ 150 and 210 from Timcal Graphite & Carbon. Additionally useful are the medium threshold percolation concentration fillers such as ENSACO™ 250 and 260 from Timcal Graphite & Carbon. The electroconductive spherical titanium dioxide of Ishihara Ltd of Japan such as the ET series, spherical titanium dioxide core coated with $SnO_2$/Sb conductive layer, 500W, ET-600W, and ET-300W. The acicular type conductive titanium dioxide FT series, rutile type acicular $TiO_2$ covered with $SnO_2$/Sb, FT-1000, FT-200, and FT-3000. The $SnO_2$/Sb transparent conductive materials SN series, pure nanoparticle (~0.02 micron) $SnO_2$/Sb spherical materials, SN-100P, SN-100D. The ultrafine-particle conductive titanium dioxide, spindle and dendrite type coated with $SnO_2$/Sb, HJ-1 and HI-2. Acicular metal oxide particles may be especially useful as the high threshold materials, as they have been found to have less impact on undesirable increase in viscosity of coating formulations. In one preferred embodiment of the invention, such acicular metal oxide particles may be used as the high threshold materials, in combination with extra-conductive carbon black as the low threshold material. In another specific embodiment, the first and the second antistatic particulate materials may comprises first and second carbon blacks of distinct threshold concentrations.

While various materials have been identified as useful as either "high" or "low" threshold percolation concentration materials, as such high and low thresholds are relative terms, certain materials may be usable as either a low or high threshold material, depending upon the threshold percolation wt % concentration of the other conductive particulate material employed. In one embodiment of the invention, the relatively low threshold particulate material and the relatively high threshold particulate material are selected such that their threshold percolation weight percent concentrations are separated by at least 1 wt percent, preferably at least 2 wt percent, more preferably at least 5 wt percent, and most preferably at least 10 wt percent. In a further embodiment, the relatively low threshold particulate material and the relatively high threshold particulate material are selected such that the low threshold particulate material has a percolation threshold wt % concentration of less than 10 wt percent, preferably less than 5 wt percent. Such relative and absolute percolation threshold wt % concentrations, in combination with the further claimed requirement that the first antistatic particulate material having a relatively low threshold percolation wt % concentration be present in the composition at from 50-150% (preferably from 50-110%, and more preferably from 90-110%) of its threshold percolation wt % concentration; and that the second antistatic particulate material having a relatively higher threshold percolation wt % concentration be present in the composition at from 1-110% (more preferably from 1-90%) of its threshold percolation wt % concentration, have been found to enable effective control of conductivities in the semi-conductive range, while also maintaining solvent coatable, castable, or extrudable capabilities as demonstrated in the following Examples.

Further, the use of a combination of first and second antistatic particulate materials in accordance with the invention enable obtaining desired semi-conductive conductivities at an overall lower level of material as compared to use of only the second relatively "high threshold" antistatic material (e.g., where the first and second antistatic particulate materials are present in a combined weight amount that is less than 150% of the threshold percolation wt % concentration of the second antistatic particulate material, more preferably less than 100% of such threshold percolation wt % concentration), while enabling effective control of conductivity not easily obtainable through use of only the first relatively "low threshold" antistatic material.

In various embodiments, the semi-conductive, static-dissipative polymeric compositions of the invention may comprise polymer binders which are castable compositions, solvent coatable compositions, melt-extrudable compositions, or radiation-curable compositions. Insulating polymeric resin binders in the form of a castable compositions, e.g., for use in forming static dissipative transfer elements for electrophotographic applications, are a particular preferred embodiment. In a particular embodiment, the invention may be applied to form a blanket cylinder comprising an antistatic layer formed from a semi-conductive, static-dissipative polymeric composition of the invention. In another embodiment, the invention may be applied to form an intermediate transfer web comprising an antistatic layer formed from a semi-conductive, static-dissipative polymeric composition of the invention.

In a further embodiment, the semi-conductive, static-dissipative polymeric compositions of the invention may be employed in the form of semi-conductive adhesive compositions capable of matching the conductivity of semi-conductive elements, e.g., transfer belt materials for fabricating imageable seamed belts. Imageable seamed belts can be fabricated, e.g., using the puzzle cut processes described in U.S. Pat. No. 6,327,454, U.S. Pat. No. 5,721,032, U.S. Pat. No. 5,487,707, and U.S. Pat. No. 5,514,436, the disclosures of which are incorporated by reference.

The following examples further illustrate the invention.

Castable Urethane Formulation

In a 500 mil plastic beaker 40.276 grams of TERATHANE™ 1000 (a polytetra-methylene ether glycol obtainable from E.I. duPont de Nemours and Co. of Wilmington, Del.) having a weight average molecular weight of 1000 g/mole was mixed with 1.93 grams of TP-30 (a polyol cross-linking agent obtainable from Perstorp Polyols, Inc. of Toledo, Ohio). To this glycol mix, the appropriate concentration of conductive material, or mixture of conductive materials, were added. The mixture was thoroughly mixed by hand, using a mixing glass rod. Afterward, the mixture was degassed in a glass bell jar under high vacuum.

To the degassed mixture above, 57.795 grams of VIBRATHANE B35 (a polymethylene-bis[4-cyclohexl diisocyanate]polyisocyanate pre-polymer obtainable from Uniroyal Chemical Company) was added with thorough mixing. The mixture was then degassed and poured into a mold to form a 0.25" slab for electrical conductivity characterization. The TERATHANE and the VIBRATHANE were kept at 60 C for processing.

Example 1

Percolation Threshold Evaluation

TPU Vulcan XC72R Carbon Black

A series of experiments were conducted using 40 grams mixture of a thermoplastic polyurethane prepared using the formulation above, except that the TP30 crosslinker was eliminated and replaced with equivalent amount of TERATHANE, and carbon black VULCAN XC72R from Cabot. The results and concentration series are reported below on Table 1 and FIG. 2.

TABLE 1

| | PU Binder grams | Vulcan XC72R grams | % Carbon | Voltage, Volts | Volume Resistivity ohm/cm |
|---|---|---|---|---|---|
| 1 | 40 | 0 | 0% | 400 | 2.30E+12 |
| 2 | 36 | 4 | 10% | 400 | 3.89E+10 |
| 3 | 34.4 | 5.6 | 14% | 400 | 2.45E+10 |
| 4 | 33.6 | 6.4 | 16% | 400 | 9.78E+09 |
| 5 | 32.8 | 7.2 | 18% | 400 | 8.04E+05 |

Figure 2:
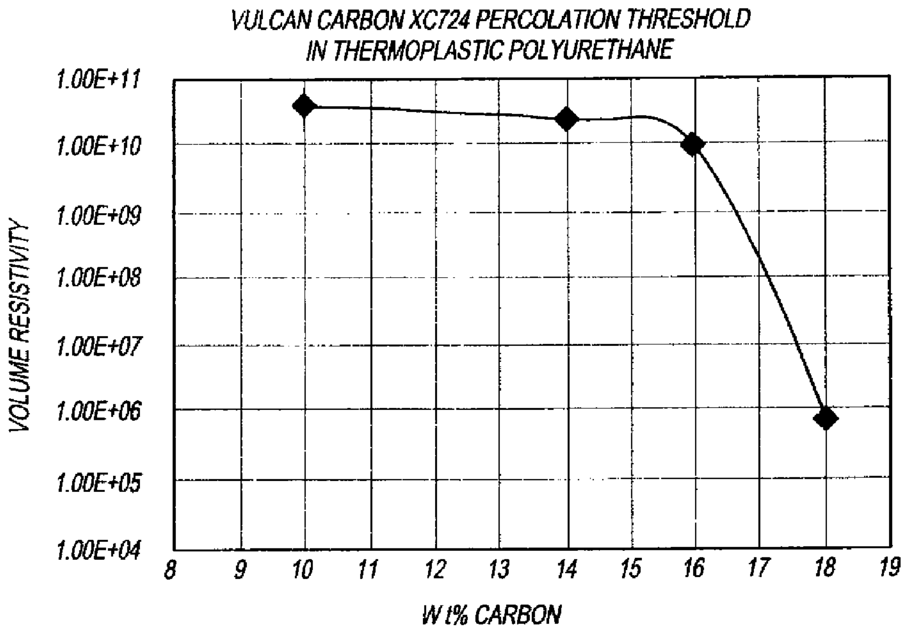
FIG. 2 is a graph showing the percolation threshold of VULCAN XC72R in a thermoplastic polyurethane.

FIG. 2 shows that the percolation threshold is about 16 wt % VULCAN XC72R. This method can be used to evaluate other polymer/carbon compositions.

Example 2

Percolation Threshold Evaluation of ENSACO™ 350 in a Castable Composition

Figure 3:
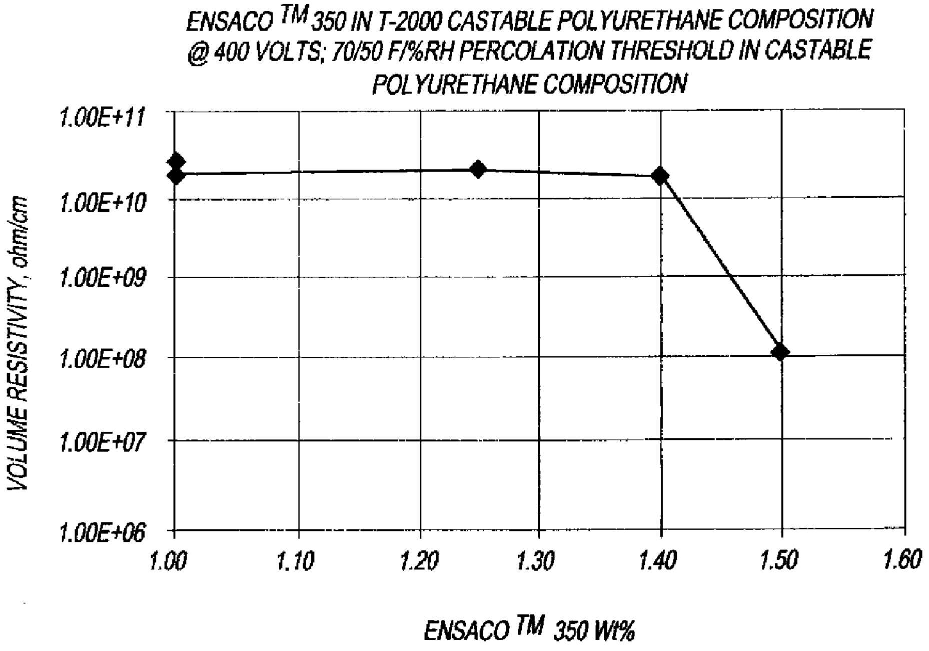
FIG. 3 is a graph showing the percolation threshold of ENSACO™ 350 in a castable composition.

A castable formulation similar to the one described above (except that TERATHANE 2000 was used in place of TERATHANE 1000) was doped with 1.0, 1.25, 1.4, and 1.5 wt % ENSACO™ 350 carbon black respectively and cast into 6/25 inch thick plaques. The processed plaques were equilibrated in a chamber at 70 F and 50% RH. Thereafter volume resistivity measurements @ 400 volts were conducted. The results are plotted in FIG. 3 and Table 2, and show a percolation concentration threshold between 1.4 and 1.5 wt %.

TABLE 2

| ENSACO ™ 350 Carbon Black | Volume Resistivity, Ohm/cm2 |
|---|---|
| 1.00 | 2.08E+10 |
| 1.25 | 1.99E+10 |
| 1.40 | 1.70E+10 |
| 1.50 | 1.20E+08 |

Example 3

Figure 4:
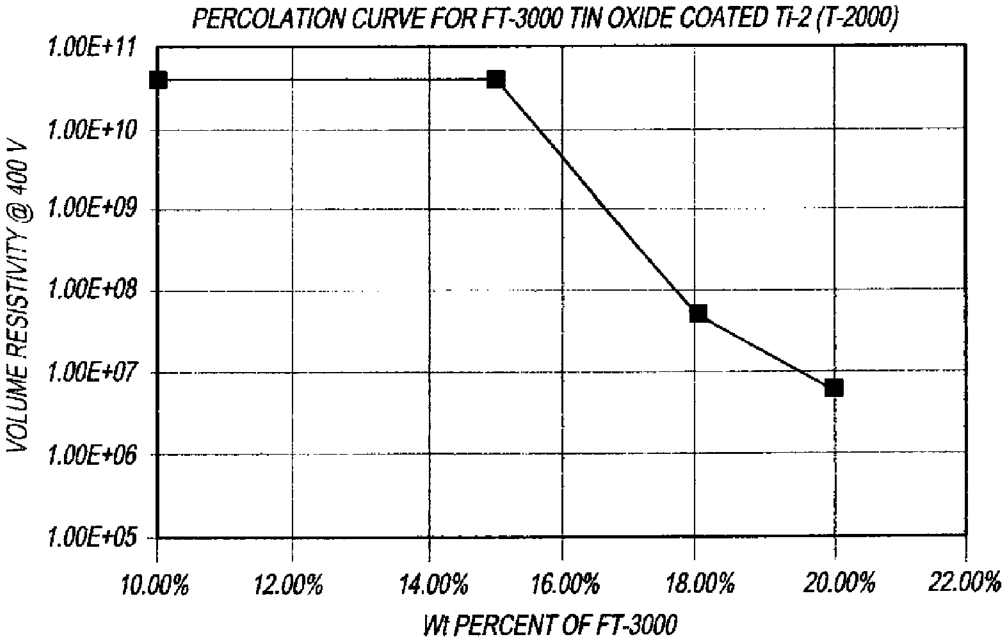
FIG. 4 is a graph showing the percolation threshold of FT-3000 tin oxide-coated $TiO_2$ in a castable composition.

Percolation Threshold Evaluation of FT-3000 Tin Oxide-Coated Acicular $TiO_2$ in a Castable Composition A castable formulation similar to the one described above (except that TERATHANE 2000 was used in place of TERATHANE 1000) was doped with 10, 15, 18, and 20 wt % FT-3000 tin oxide-coated acicular $TiO_2$ respectively and cast into 6/25 inch thick plaques. The processed plaques were equilibrated in a chamber at 70 F and 50% RH. Thereafter volume resistivity measurements @ 400 volts were conducted. The results are plotted in FIG. 4 and Table 3, and show a percolation concentration threshold between 14 and 16 wt %.

The tin oxide-coated acicular materials have an advantage over many other conductive particulate materials in that they do not impart excessive increased viscosity to the compositions. Thus even at concentration as high at 25 wt % the composition is still castable.

TABLE 3

| | FT-3000 Acicular TiO2-Coated SnO2 (wt %) | Volume Resistivity, (ohm/cm) |
|---|---|---|
| 1 | 10.00% | 4.00E+10 |
| 2 | 15.00% | 3.90E+10 |
| 4 | 18.00% | 5.30E+07 |
| 5 | 20.00% | 6.20E+06 |

Example 4

Conductivity of ENSACO™ 250 in a Castable Composition

Figure 5:
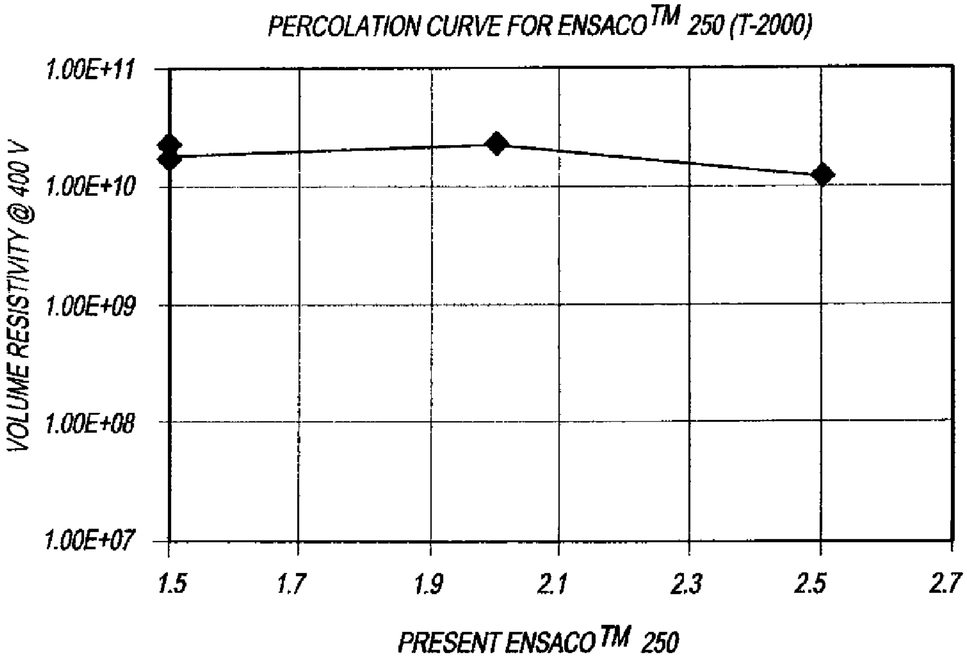
FIG. 5 is a graph showing conductivity of ENSACO™ 250 in a castable composition.

A castable formulation similar to the one described above (except that TERATHANE 2000 was used in place of terathane 1000) was doped with 1.5, 2.0, and 2.5 wt % high threshold ENSACO™ 250 carbon black respectively and cast into 0.25 inch thick plaques. The processed plaques were equilibrated in a chamber at 70 F and 50% RH. Thereafter volume resistivity measurements @ 400 volts were conducted. The results are plotted in FIG. 5 and show that even @ 2.5 wt % the percolation concentration threshold is not reached. Thus it becomes impractical to use this carbon by itself in castable compositions. At concentrations closed with the percolation threshold, the viscosity of the compositions become too high thus making them non castable.

Example 5

Cast Urethane with Controlled Conductivity Using Tin Oxide-Coated Acicular $TiO_2$ ("High Threshold") and ENSACO™ 350 Carbon Black ("Low Threshold")

Figure 6A:
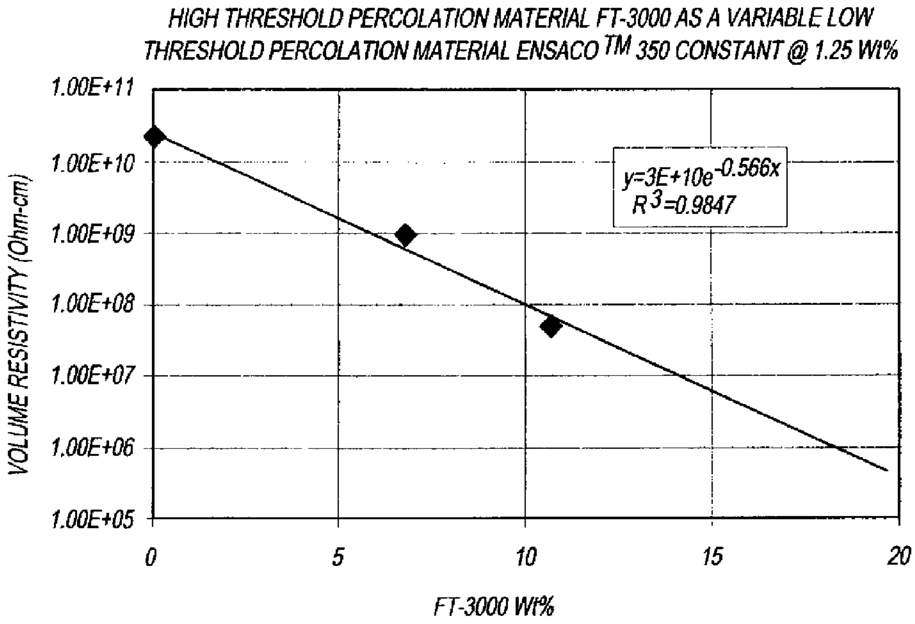
FIG. 6*a* is a graph showing static dissipative compositions having controlled conductivity using the “Low Threshold Percolation” material ENSACO™ 350 constant @ 1.25 Wt %, and the “High Threshold Percolation” material FT-3000 as a variable, in a castable polyurethane composition.
Figure 6B:
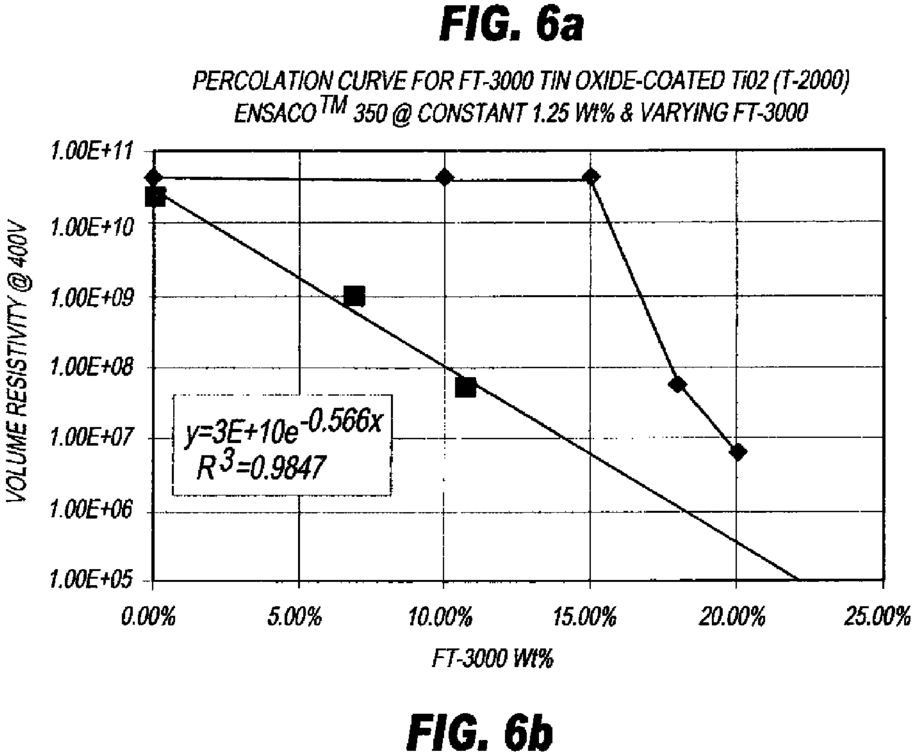
FIG. 6*b* shows the graphs of FIG. 6*a* and FIG. 4 together emphasizing the effects of this invention.

Three castable formulations using ENSACO™ 350 ("low threshold") at a constant 1.25 wt %, in combination with various level of FT3000 ("high threshold") were mixed and processed as described in Example 2. The volume resistivity results are plotted in FIG. 6*a* and shown in Table 4. The plot in FIG. 6*a* shows that the volume resistivity can be controlled in a linear fashion from $10^{10}$ to $10^5$. At 1.25 wt % (~80% of the percolation threshold) ENSACO™ 350, and 10.75 wt % (~68% of the percolation threshold) a resistivity of $5.1\times10^7$ is obtained. This level of conductivity is not attainable with the respective conductive materials alone, both being below their percolation threshold.

TABLE 4

| FT-3000 Acicular $TiO_2$-Coated $SnO_2$ (wt %) | ENSACO ™ 350 Carbon Black (wt %) | Volume Resistivity, (ohm/cm) |
|---|---|---|
| 0 | 1.25 | 2.50E+10 |
| 4.75 | 1.25 | 1.30E+10 |
| 6.75 | 1.25 | 1.00E+09 |
| 10.75 | 1.25 | 5.10E+07 |

Example 6

Cast Urethane with Controlled Conductivity Using ENSACO™ 250 Carbon Black ("High Threshold") and ENSACO™ 350 Carbon Black ("Low Threshold")

Figure 7A:
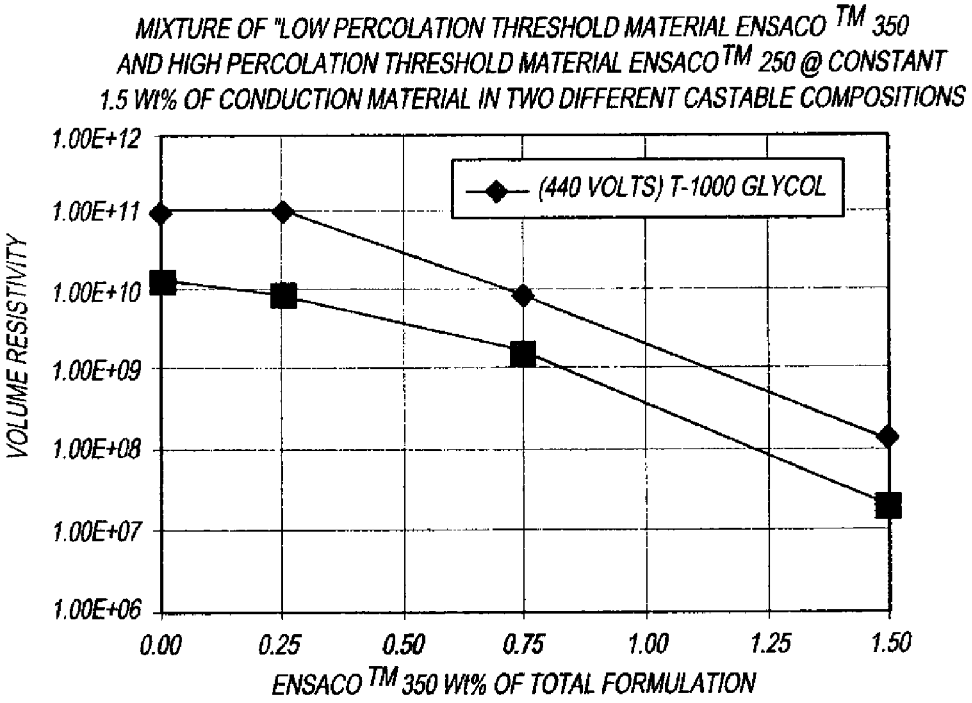
FIG. 7*a* is a graph showing two static dissipative compositions using mixtures of the “Low Threshold Percolation” material ENSACO™ 350 and the “High Threshold Percolation” material ENSACO™ 250 at a constant total concentration of 1.5 wt % in two different castable compositions.
Figure 7B:
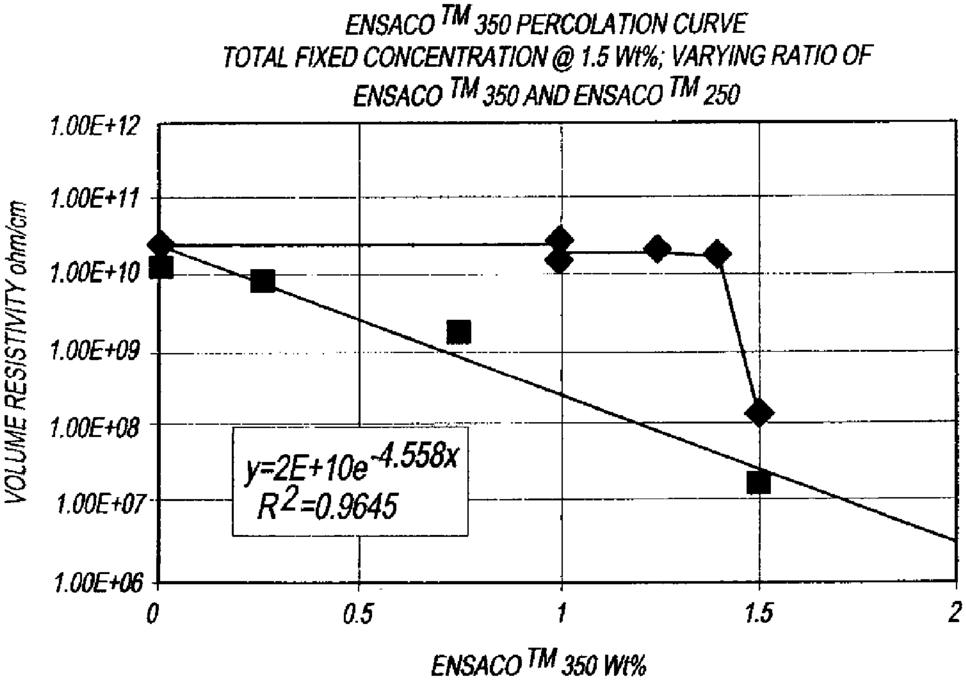
FIG. 7*b* shows the graphs of FIG. 7*a* and FIG. 3 together emphasizing the effects of this invention.

Four castable formulations using ENSACO™ 350 ("low threshold") and ENSACO™ 250 ("high threshold") at an overall constant 1.5 wt % total carbon while varying the ratio of ENSACO™ 350 relative to ENSACO™ 350 (Table 6). In this example, TERATHANE 2000 glycol was used. The samples were mixed and processed as described in example 2. The volume resistivity results are plotted in FIG. 7*a* and shown in Table 5. The plot in FIG. 7*a* shows that the volume resistivity can be controlled in a wide range from $10^{10}$ to $10^7$. When the two plots of FIG. 7*a* are compared, it is seen that the urethane matrix has an impact on the absolute resistivity; however the control over resistivity is relatively the same for both matrixes. At 1.5 wt %, ENSACO™ 250 is well below its percolation threshold concentration. At 1.5 wt % ENSACO™ 350 is just at about its percolation threshold concentration. Yet by combining them at various ratio conductivity is imparted to the insulating material in a controllable manner.

TABLE 5

| | Binder | ENSACO ™ 250 Carbon Black | ENSACO ™ 350 Carbon Black | Volume Resistivity, ohm-cm |
|---|---|---|---|---|
| 1 | T-2000 | 1.50 | 0.00 | 9.50E+10 |
| 2 | T-2000 | 0.75 | 0.25 | 1.00E+11 |
| 3 | T-2000 | 0.75 | 0.75 | 8.50E+09 |
| 4 | T-2000 | 0.00 | 1.50 | 1.20E+08 |
| 5 | T-1000 | 1.5 | 0 | 1.35E+10 |
| 6 | T-1000 | 1.25 | 0.25 | 8.90E+09 |
| 7 | T-1000 | 0.75 | 0.75 | 1.55E+09 |
| 8 | T-1000 | 0 | 1.5 | 1.65E+07 |

Example 7

Cast Polyurethane with Controlled Conductivity Using Tin Oxide Coated Acicular $TiO_2$ ("High Threshold") and ENSACO™ 350 Carbon Black ("Low Threshold")

Figure 8A:
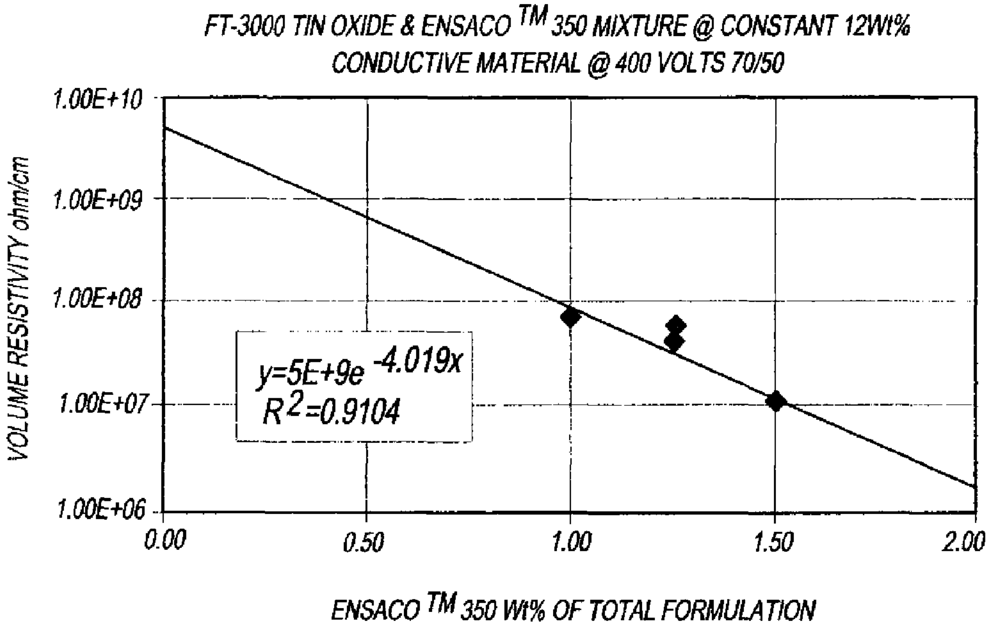
FIG. 8*a* is a graph showing static dissipative compositions using mixtures compositions using mixtures of the “Low Threshold Percolation” material ENSACO™ 350 and the “High Threshold Percolation” material FT3000 at a constant 12 wt % total doping.
Figure 8B:
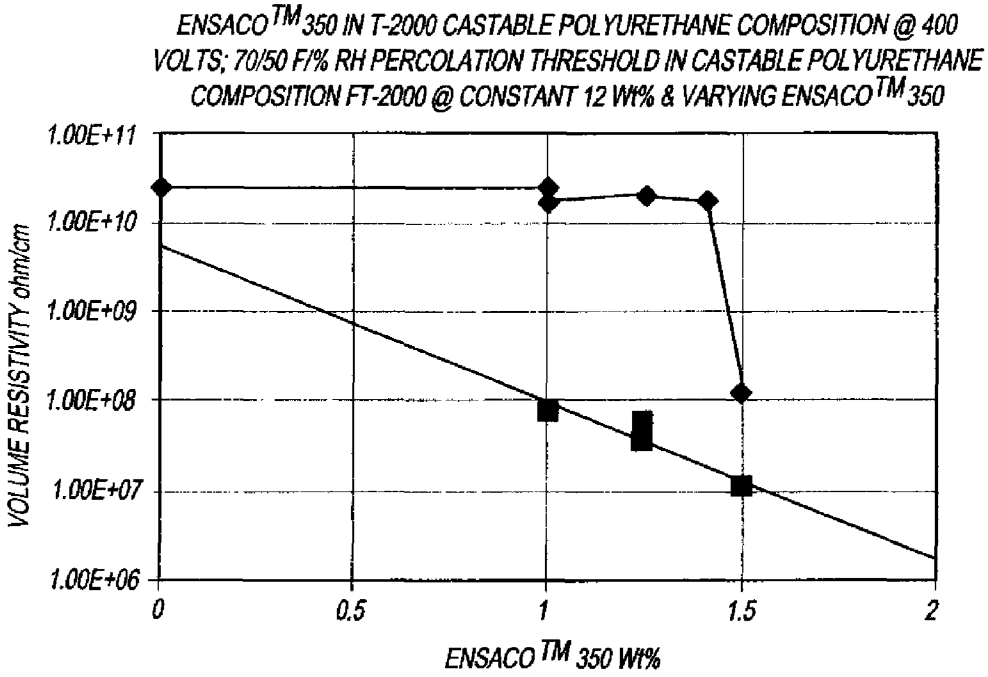
FIG. 8*b* shows the graphs of FIG. 8*a* and FIG. 3 together emphasizing the effects of this invention.

Four castable formulations using ENSACO™ 350 ("low threshold") in combination to various level of FT3000 ("high threshold") at a constant 12 wt % total doping, were mixed and processed as described in example 2. The volume resistivity results at 10 V are plotted in FIG. 8*a* and shown in Table 6. The plot in FIG. 8*a* shows that volume resistivity is imparted to the insulating binder in a controlled fashion from $10^{12}$ to $10^5$.

TABLE 6

| FT-3000 Acicular TiO2-Coated SnO2 (wt %) | ENSACO ™ 350 Carbon Black (wt %) | Volume Resistivity, (ohm/cm) |
|---|---|---|
| 11.00 | 1.00 | 7.10E+07 |
| 10.75 | 1.25 | 4.80E+07 |
| 10.50 | 1.50 | 1.05E+07 |

The invention has been described in detail with particular reference to certain preferred embodiments thereof, but it will be understood that variations and modifications can be effected within the spirit and scope of the invention.

The invention claimed is:

1. A semi-conductive, static-dissipative polymeric composition comprising:

a polymer binder;

a first antistatic particulate material comprising carbon black and having a threshold percolation wt % concentration of less than 5 wt percent, wherein the first antistatic particulate material is present in the composition at from 50-150% of its threshold percolation concentration; and a second antistatic particulate material having a threshold percolation wt % concentration which is relatively higher than that of the first antistatic particulate material, wherein the second antistatic particulate material is present in the composition at from 1-110% of its threshold percolation concentration.

2. The static-dissipative polymeric composition of claim 1, wherein the first and second antistatic particulate materials are present in a combined weight amount that is less than 150% of the threshold percolation wt % concentration of the second antistatic particulate material.

3. The static-dissipative polymeric composition of claim 1, wherein the first and second antistatic particulate materials are present in a combined weight amount that is less than 100% of the threshold percolation wt % concentration of the second antistatic particulate material.

4. The static-dissipative polymeric composition of claim 1, wherein the first antistatic particulate material is present in the composition at from 50-110% of its threshold percolation concentration.

5. The static-dissipative polymeric composition of claim 1, wherein the first antistatic particulate material is present in the composition at from 90-110% of its threshold percolation concentration.

6. The static-dissipative polymeric composition of claim 1, wherein the second antistatic particulate material is present in the composition at from 1-90% of its threshold percolation concentration.

7. The static-dissipative polymeric composition of claim 1, wherein the second antistatic particulate material comprises acicular metal oxide particles.

8. The static-dissipative polymeric composition of claim 1, wherein the first and the second antistatic particulate materials comprise first and second carbon blacks.

9. The static-dissipative polymeric composition of claim 1, wherein the polymer binder comprises a thermoplastic or thermoset polyurethane or polyurea composition.

10. The static-dissipative polymeric composition of claim 1, wherein the polymer binder comprises a thermoset polyurethane or polyurea composition.

11. The static-dissipative polymeric composition of claim 1, having a volume resistivity of from about $10^4$ ohm-cm to about $10^{11}$ ohm-cm.

12. The semi-conductive, static-dissipative polymeric composition of claim 1 whereas the polymer binder is a castable thermoset polymer composition.

13. The semi-conductive, static-dissipative polymeric composition of claim 1 whereas the polymer binder is a solvent coatable composition.

14. The semi-conductive, static-dissipative polymeric composition of claim 1 whereas the polymer binder is a radiation-curable composition.

15. The semi-conductive, static-dissipative polymeric composition of claim 1 whereas the polymer binder is a melt-extrudable composition.

16. The semi-conductive, static-dissipative polymeric composition of claim 1, wherein the first and second antistatic particulate materials have threshold percolation weight percent concentrations separated by at least 1 wt percent.

17. The semi-conductive, static-dissipative polymeric composition of claim 1, wherein the first and second antistatic particulate materials have threshold percolation weight percent concentrations separated by at least 5 wt percent.

18. The static-dissipative polymeric composition of claim 17, wherein the polymer binder comprises a thermoset polyurethane or polyurea composition.

19. The static-dissipative polymeric composition of claim 17, having a volume resistivity of from about $10^4$ ohm-cm to about $10^{11}$ ohm-cm.

20. The semi-conductive, static-dissipative polymeric composition of claim 17 whereas the polymer binder is a castable thermoset polymer composition.

* * * * *